Sheet 2, 2 Sheets.

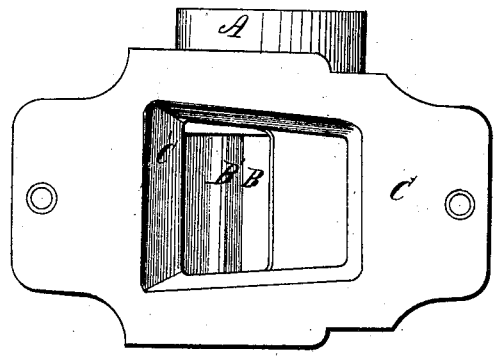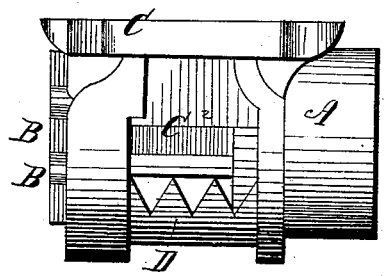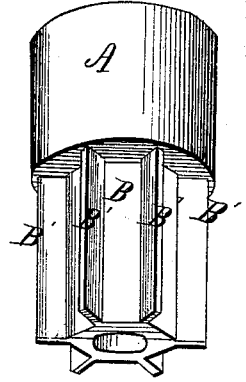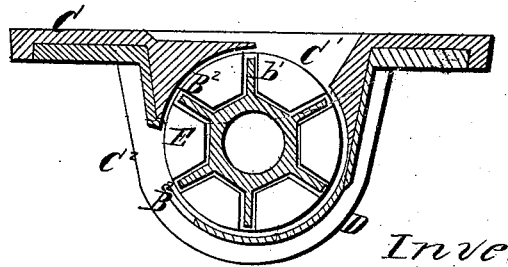

W. A. Van Brunt.
Seeding Mach.

Nº 97,137.  Patented Nov. 23, 1869.

Witnesses
J. B. Smith
H. S. Hook

Inventor
W. A. Van Brunt

United States Patent Office.

W. A. VAN BRUNT, OF HORICON, WISCONSIN.

Letters Patent No. 97,137, dated November 23, 1869.

IMPROVEMENT IN SEEDING-MACHINES.

The Schedule referred to in these Letters Patent and making part of the same.

*To all whom it may concern:*

Be it known that I, W. A. VAN BRUNT, of Horicon, Dodge county, and State of Wisconsin, have invented certain new and useful Improvements in Seeding-Devices; and I do hereby declare the following to be a full, clear, and exact description thereof, reference being had to the accompanying drawings, forming part of this specification, in which—

Figure 1:
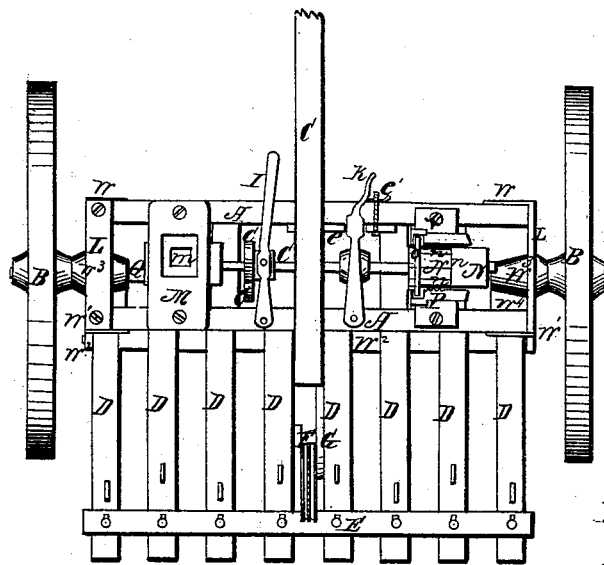
Figure 2:
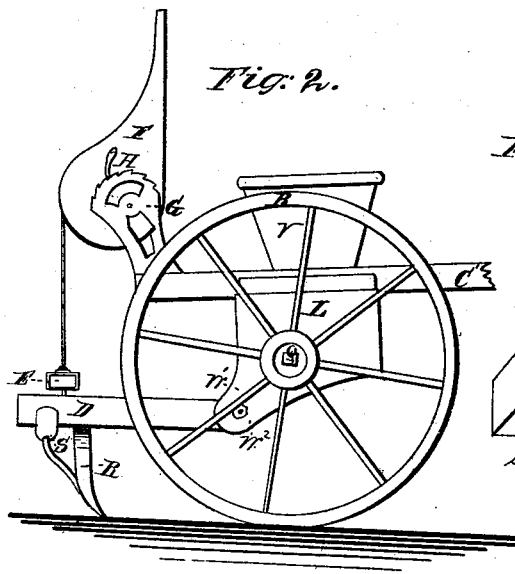
Figures 3, 4:
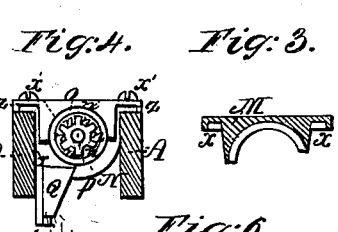
Figure 5:
Figure 6:
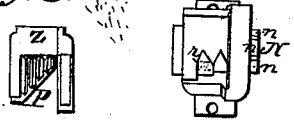
Figures 7, 8:
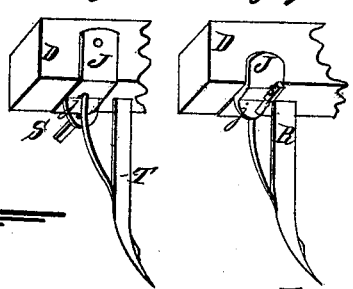

Figure 1 is a plan view.
Figure 2 is a side elevation.
Figure 3 is a perspective view of seeding-cylinder.
Figure 4, vertical cross-section.

The nature of this invention has relation to a seeding-cylinder, constructed as clearly shown in fig. 3, and arranged to operate as shown in the other figures.

This cylinder is provided with a suitable bearing, A, and with seed-cups B, running lengthwise, formed by the radial flanges $B^1$, whose edges do not extend out as far as the periphery of the bearing A; that is, a circle, of which these flanges would be the radii, would not be as large as the circumference of the bearing.

C is the cap, covering said cylinder, and D is the hanger bolted thereto, forming, together, a box, the bore of which is of a size with the bearing A, so that when the seeding-cylinder is therein, a space, $B^2$, will be left between the edges of the radial flanges $B^1$, and the inner surface or bore of the said box, for the purpose of preventing the crushing of the seeds as the cylinder revolves, while at the same time, by moving the cylinder on its shaft, in either direction of its length, the quantity of seeds received into the cups and discharged, is regulated, the width of the space $B^2$ being that left between the shoulder of the bearing A and sliding head E.

When the shoulder of the bearing A is moved close up to the sliding head E, the cylinder is prevented from receiving or being charged with grain, and as the bearing fits closely within the box formed by the hanger and cap, no grain can escape between the bearing and bore of said box.

The cap C is provided with an opening, $C^1$, for the entrance of grain to the seed-cups B, on one side of the vertical diameter of the cylinder.

The opening $C^2$, for the discharge of seed, is in the hanger, on the opposite side of said vertical diameter.

Thus the seeds are received and discharged on opposite sides of the vertical diameter of the seeding-cylinder, which prevents the escape of grain when the seeder is not in operation.

What I claim as my invention, and seek to secure by Letters Patent, is—

1. The adjustable seeding-cylinder, with radial flanges $B^1$, of about one-eighth of an inch radius less than the bearing part A of the cylinder, or sufficient to allow the grain to pass without crushing, said radial flanges running lengthwise of the cylinder, substantially as and for the purpose specified.

2. In combination with the adjusting seeding-cylinder, above claimed, so arranging the opening $C^1$ for receiving, and the opening $C^2$ for discharging the grain, that the latter shall be received and discharged on opposite sides of the vertical diameter of the seeding-cylinder, substantially as and for the purpose set forth.

W. A. VAN BRUNT.

Witnesses:
J. B. SMITH,
H. S. LOOK.